Figure 1:
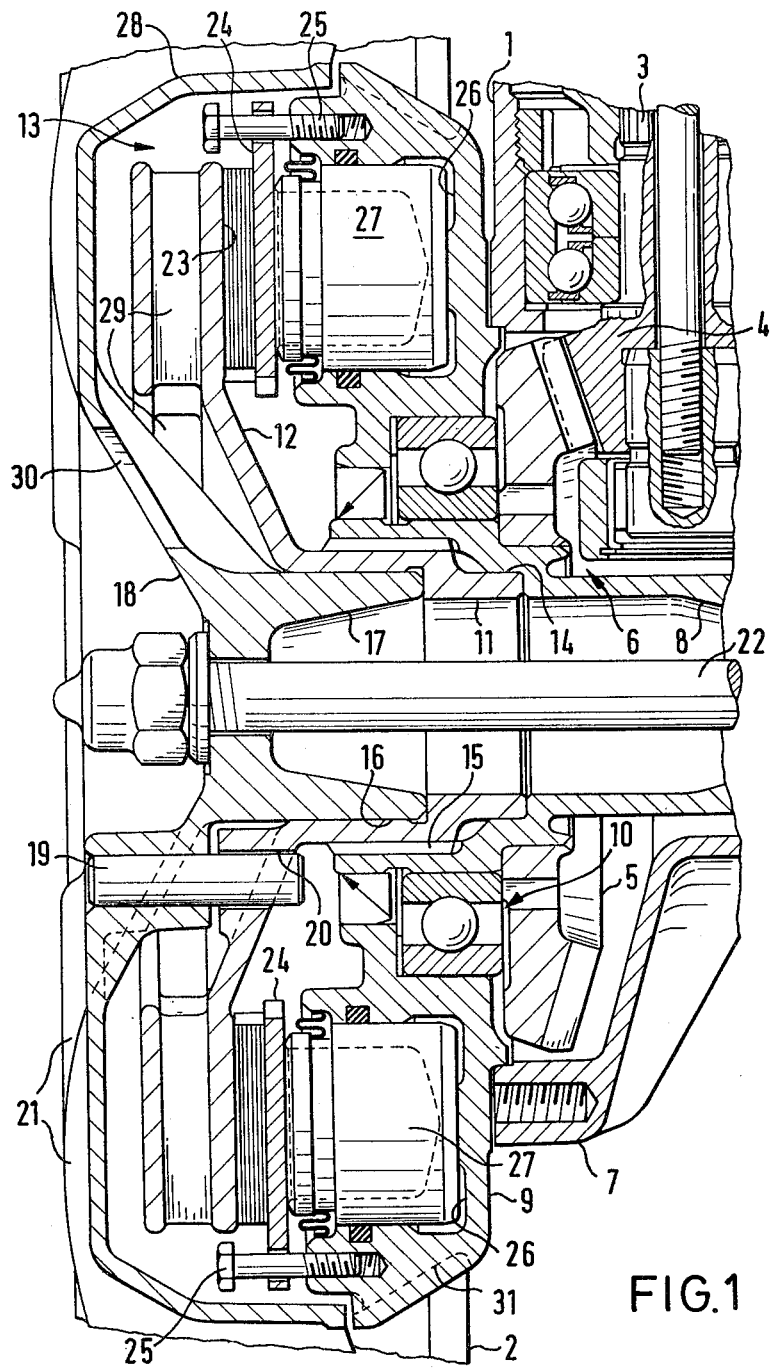

United States Patent [19]

Erdmann

[11] 4,226,304
[45] Oct. 7, 1980

[54] DISK BRAKE FOR VEHICLES, ESPECIALLY FOR MOTORCYCLES

[75] Inventor: Klaus Erdmann, Munich, Fed. Rep. of Germany

[73] Assignee: Bayerische Motoren Werke Aktiengesellschaft, Fed. Rep. of Germany

[21] Appl. No.: 964,636

[22] Filed: Nov. 29, 1978

[30] Foreign Application Priority Data

Dec. 2, 1977 [DE] Fed. Rep. of Germany ....... 2753753

[51] Int. Cl.² .............................................. F16D 65/12
[52] U.S. Cl. .................................. 188/18 A; 301/6 E; 301/6 V
[58] Field of Search ............. 188/18 A, 71.6, 218 XL, 188/264 A, 264 AA; 301/6 R, 6 CS, 6 E, 6 V; 192/70.16, 113 A

[56] References Cited

U.S. PATENT DOCUMENTS

| 2,156,412 | 5/1939 | Tingle | 301/6 V |
| 2,423,011 | 6/1947 | DuBois | 188/18 A |
| 3,010,543 | 11/1961 | Pear | 188/264 AA |
| 3,351,157 | 11/1967 | Claveau | 188/18 A |
| 3,403,760 | 10/1968 | Caskey | 188/218 XL |
| 4,118,073 | 10/1978 | Marwitz | 301/6 V |

FOREIGN PATENT DOCUMENTS

| 1806566 | 5/1970 | Fed. Rep. of Germany | 301/6 E |
| 2410971 | 9/1974 | Fed. Rep. of Germany | 188/18 A |

Primary Examiner—Edward R. Kazenske
Attorney, Agent, or Firm—Craig & Antonelli

[57] ABSTRACT

A disk brake arrangement in a motorcycle equipped with a wheel supported unilaterally at a wheel guide member whose wheel hub is connected with the wheel spokes, with a support hub rotatably supported relative to the wheel guide member as well as with a brake disk; the brake disk is thereby also provided with a brake disk hub which is clamped-in between the support hub and the wheel hub by way of a central connection.

3 Claims, 2 Drawing Figures

DISK BRAKE FOR VEHICLES, ESPECIALLY FOR MOTORCYCLES

The present invention relates to a disk brake arrangement in a vehicle, especially in a motorcycle with a wheel supported unilaterally at a wheel guide member and having a wheel hub connected with the wheel spokes, whereby the wheel hub is connected with a support hub supported at the wheel guide member as well as with a brake disk.

Such an arrangement is known with the motorcycle "Hägglund XM 72" which is described in the publication "Das Motorrad" ("The Motorcycle", Volume 1 of 1973). With this arrangement, the wheel as well as the brake disk are each secured independently at the support hub in several places.

The disassembly of the wheel as well as of the brake disk which, as known, requires a refinishing from time to time, is costly in a disadvantageous manner with this prior art arrangement.

Accordingly, the present invention is concerned with the task to so improve a disk brake arrangement of the aforementioned type in its construction that a more simple handling is achieved during the assembly and disassembly of the wheel as well as during the examination of the disk brake.

The underlying problems are solved according to the present invention by a brake disk with a hub which is clamped-in between the support hub and the wheel hub by way of a central connection.

The central connection enables a rapid and simple assembly and disassembly of the wheel. The advantage of the present invention resides in that during a disassembly of the wheel, also the brake disk can be simultaneously removed without further expenditure in case this is necessary for an overhauling or for an exchange of the brake disk. Preferably, the brake disk together with its hub may be retained in the support hub by a slight force fit, as a result of which an unintentional disengagement of the brake disk with disadvantageous consequences is avoided during a rapid removal of the wheel or during a rapid wheel change.

The present invention additionally enables an advantageous further development of the disk brake arrangement to the effect that the brake disk includes merely one essentially radial brake surface and that a device feedng a friction lining is arranged at, respectively, in a section of the wheel guide member.

Even though a disk brake for vehicle wheels with a unilaterally fed or actuated brake ring is known already from the German Offenlegungsschrift No. 25 04 224, the friction lining and the feed device are provided in this prior art disk brake at a brake anchoring plate seated on the wheel axle. As a result of this arrangement, the brake anchoring plate has to be removed at the same time during each wheel disassembly, respectively, during each examination of the disk brake.

In contradistinction thereto, a considerably more simple handling during the disassembly and assembly of the wheel will result with the arrangement according to the present invention of the friction lining and of the feed device at the wheel guide member.

After the disengagement of the central connection, the wheel hub and together with the same the wheel may be removed whereas the brake disk remains in the support hub and the feed or actuating device together with the friction lining remains at the wheel guide member.

With a housing on the wheel guide member receiving the support hub, chambers are provided in a preferred embodiment according to the present invention within a wall of the housing facing the brake surface of the brake disk for the accommodation of pressure pistons. The pressure pistons are angularly unformly displaced with respect to one another in the circumferential direction for the uniform loading of the brake disk and act on brake shoes supported on the housing wall.

The arrangement described hereinabove can be accommodated in an advantageously simple manner within a pot-shaped wheel hub for the protection against water and dirt. A nearly complete encapsulation is attained by means of a drum of the wheel hub guided past the outer circumference of the brake disk and extending up to the housing wall except for a slight spacing. A compact and well-encapsulated disk brake is created therewith in an advantageous manner.

The handling of the wheel assembly and disassembly as well as the examination of the disk brake are considerably facilitated with a driven wheel according to further features of the present invention in that the brake disk is centered by way of its hub in the driven support hub and is nonrotatably connected therewith by way of a profile and additionally cooperates with the wheel hub by way of a plug connection, whereby the wheel hub is introduced or inserted into a fitting bore of the brake hub by way of a centering extension. A threaded bolt may be provided as central connection, by way of which the wheel hub, the brake hub and the support hub are clamped against one another.

The disk brake arrangement according to the present invention is suitable above all in motorcycles for wheels guided on swinging one-arm guide structures, especially for driven rear wheels.

Accordingly, it is an object of the present invention to provide a disk brake arrangement for a vehicle, especially for a motorcycle which avoids by simple means the aformentioned shortcomings and drawbacks encountered in the prior art.

Another object of the present invention resides in a disk brake arrangement for a vehicle, especially a motorcycle, in which the wheel as well as the brake disk can be more easily assembled and disassembled.

A further object of the present invention resides in a disk brake arrangement for a vehicle which permits a more simple handling during the assembly and disassembly of the wheel as well as during the examination of the disk brake.

Still another object of the present invention resides in a disk brake of the type described above in which during the disassembly of the wheel also the brake disk can be removed at the same time without further expenditure in time and effort.

A further object of the present invention resides in a disk brake for vehicles, especially for motorcycles, which can be effectively protected in a simple manner against water and dirt.

Still another object of the present invention resides in a disk brake arrangement which permits a good encapsulation thereof, utilizing a compact construction by extremely simple means.

Figure 2:
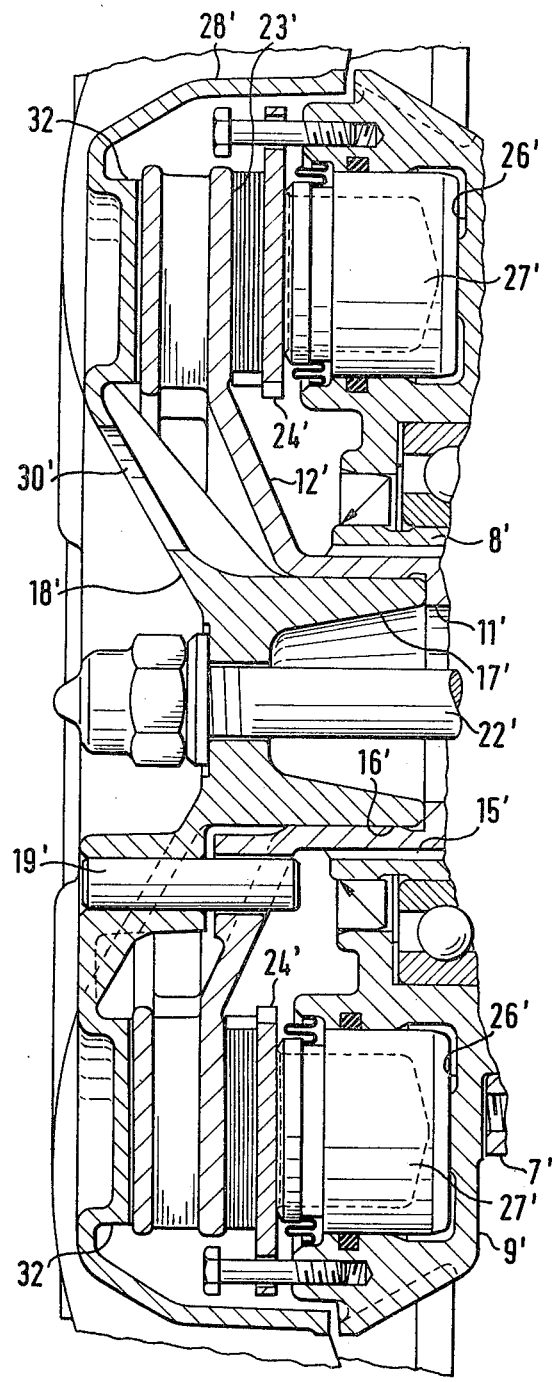

These and other objects, features and advantages of the present invention will become more apparent from the following description when taken in connection with the accompanying drawing which shows, for purposes of illustration only, two embodiments in accordance with the present invention, and wherein:

FIG. 1 is an axial cross-sectional view through a disk brake according to the present invention for the rear wheel of a motorcycle with cardan drive; and FIG. 2 is a partial cross-sectional view, similar to FIG. 1, through a modified embodiment of a disk brake in accordance with the present invention for the rear wheel of a motorcycle with a cardan drive.

Referring now to the drawing wherein corresponding reference numerals are used throughout the two views, and more particularly to FIG. 1, reference numeral 1 indicates a swinging one-arm or single arm guide member, not shown in detail, in a motorcycle for the guidance of a driven rear wheel 2. The rear wheel 2 is equipped with a disk brake generally designated by reference numeral 13. The disk brake 13 includes a brake disk 12 which is provided exclusively with one radial brake surface 23. The brake surface 23 is directed toward a wall 9 of a housing 7 receiving the wheel drive generally designated by reference numeral 6. Chambers 26 for the accommodation of preferably hydraulically actuated pressure pistons 27 are provided in the housing wall 9, which pressure pistons press the brake shoes 24 against the brake surface 23. In order to avoid a tilting of the unilaterally actuated brake disk 12, preferably two pressure pistons 27 are arranged in the housing wall 9 in diametral position. The brake shoes 24 may be retained, respectively, supported by way of threaded bolts 25 arranged in the housing wall 9.

As can be further seen from FIG. 1, the brake disk 12 includes a hub 11. The brake hub 11 is centered at 14 in a support hub 8 rigidly connected with a spur bevel gear 5 of the wheel drive 6 and cooperates form-lockingly at 15 by way of a profile for the non-rotatable connection with the support hub 8 to assure rotation in unison therewith. The support hub 8 is journalled or supported several times in the housing 7 connected with the swinging one-arm guide member, of which the bearing generally designated by reference numeral 10 arranged in the housing wall 9 is shown in the drawing. The spur bevel gear 5 of the wheel drive 6 which is connected with the support hub 8, meshes with a pinion 4 which is driven from a cardan shaft 3 within the one-arm guide member 1.

The brake hub 11, in its turn, includes a fitting bore 16 for the mounting of a centering extension 17 of the wheel hub 18. Entrainment bolts 19 are provided for the non-rotatable connection of the wheel hub 18, whereby the entrainment bolts 19 preferably securely arranged in the wheel hub 18 engage in apertures 20 of the brake disk 12. The wheel hub 18 and therewith the rear wheel 2 is retained at the swinging one-arm support guide member 1 by a central threaded bolt 22, by means of which the wheel hub 18 is clamped against the support hub 8 by way of the brake hub 11.

The wheel hub 18 of the rear wheel 2 made, for example, with cast spokes 21, is constructed pot-shaped, whereby a cylindrical drum 28 of the wheel hub 18 is extended up to the housing wall 9 except for a small gap. For purposes of cooling of the encapsulated disk brake 13, in that connection especially of the brake disk 12, the brake disk 12 is provided with air supply channels 29. Several apertures 30 are provided in the wheel hub 18 for the inflow of cooling air. The heated air is exhausted by way of the gap between the drum 28 and the housing wall 9 as well as by way of the apertures 31 leading away from the gap in the housing wall 9.

In the embodiment of FIG. 2, a wheel hub 18' is provided with embossments or raised portions 32 at its inner side facing the brake disk 12' for the abutment of the brake disk 12' in case of high load. As to the rest, those parts corresponding to the parts in FIG. 1 are designated in FIG. 2 by the same, though primed reference numerals.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A disk brake arrangement in a vehicle, comprising a wheel means having a wheel hub connected with wheel spokes, said wheel means being supported unilaterally at a wheel guide means, said wheel hub being operatively connected with a support hub rotatably supported at the wheel guide means as well as with a brake disk means, the brake disk means including an axially extending brake disk hub which is clamped in between the support hub and the wheel hub by way of a central connecting means, characterized in that said wheel hub has a central axially extending portion which is centered in a stepped through bore of the brake disk hub, said brake disk hub being non-rotatably connected with said wheel hub and on its outer circumferential surface being centered and connected in a non-rotatable manner in the support hub, whereby the suppot hub is located in the region of the connection of the brake disk hub and the wheel hub, and wherein said central connecting means clamping said brake disk hub between said support hub and said wheel hub is a central threaded bolt.

2. A disk brake arrangement according to claim 1 wherein the wheel means is a driven wheel and the support hub is inwardly spaced from a housing means provided on the wheel guide means, said wheel guide means being in the form of a one-arm suspension, and wherein said brake disk means includes exclusively one essentially radial brake surface arranged in the wheel hub which is constructed pot-shaped and includes a drum portion extending over the outer circumference of the brake disk means, said drum portion extending up to a wall of the housing means except for a slight spacing, chambers for the accommodation of pressure pistons being provided in the wall of the housing means facing the brake surface of the brake disk means, the pressure pistons being provided in the respective chambers and operatively connected with brake shoe means for moving said brake shoe means into and out of braking contact with said brake surface.

3. A disk brake arrangement according to claim 2, wherein the wheel hub includes raised portions juxtaposed the brake disk means with a slight spacing therebetween.

* * * * *